(12) United States Patent
Wang et al.

(10) Patent No.: US 11,954,210 B2
(45) Date of Patent: Apr. 9, 2024

(54) HIERARCHICAL HEALTH INDEX EVALUATION METHOD AND APPARATUS FOR INTELLIGENT SUBSTATION

(71) Applicants: State Grid Shandong Electric Power Research Institute, Shandong (CN); State Grid Corporation of China, Beijing (CN)

(72) Inventors: Wenting Wang, Shandong (CN); Zheng Xu, Shandong (CN); Xin Liu, Shandong (CN); Yujie Geng, Shandong (CN); Qigui Nie, Shandong (CN); Lin Lin, Shandong (CN); Jing Liu, Shandong (CN); Guodong Lv, Shandong (CN); Yang Zhao, Shandong (CN); Tiancheng Ren, Shandong (CN); Xiaohong Zhao, Shandong (CN)

(73) Assignees: State Grid Shandong Electric Power Research Institute, Jinan (CN); State Grid Corporation of China, Beijing (CN)

( * ) Notice: Subject to any disclaimer, the term of this patent is extended or adjusted under 35 U.S.C. 154(b) by 0 days.

(21) Appl. No.: 17/765,055

(22) PCT Filed: Dec. 29, 2021

(86) PCT No.: PCT/CN2021/142285
§ 371 (c)(1),
(2) Date: Mar. 30, 2022

(87) PCT Pub. No.: WO2022/242181
PCT Pub. Date: Nov. 24, 2022

(65) Prior Publication Data
US 2024/0054226 A1 Feb. 15, 2024

(30) Foreign Application Priority Data
May 17, 2021 (CN) .......................... 202110532030.7

(51) Int. Cl.
*G06F 21/57* (2013.01)
*H04L 43/50* (2022.01)

(52) U.S. Cl.
CPC ............ *G06F 21/577* (2013.01); *H04L 43/50* (2013.01); *G06F 2221/034* (2013.01)

(58) Field of Classification Search
CPC . G06F 21/577; G06F 2221/034; H04L 43/50; H04L 41/0681; H04L 41/0813;
(Continued)

(56) References Cited

U.S. PATENT DOCUMENTS

2012/0239373 A1* 9/2012 Parapurath .............. H04L 43/50
703/18
2014/0280899 A1* 9/2014 Brewster, Jr. ....... H04L 43/0817
709/224
(Continued)

FOREIGN PATENT DOCUMENTS

CN 107612144 A 1/2018
CN 112162907 A 1/2021

*Primary Examiner* — Michael Won

(57) ABSTRACT

A hierarchical health index evaluation method for an intelligent substation includes: obtaining a basic health index of a device based on static information and dynamic information of the device; obtaining a device correlation based on a communication connection relationship between the device and another device, and correcting the basic health index of the device based on the device correlation to obtain a health index of the device; obtaining a layer-based health index of a layer based on a device health index and a device importance weight of the layer; obtaining a whole-station health index of an intelligent substation based on a layer-based health index of each layer and a sum of device importance weights of each layer; and regulating the intelligent substation based on a health index of each device in the intelligent substation, the layer-based health index of each layer, and the whole-station health index.

16 Claims, 3 Drawing Sheets

(58) Field of Classification Search
CPC . H04L 41/0823; H04L 47/25; H04L 67/1012; H04W 24/08; H04W 28/0231; H04W 28/0247
See application file for complete search history.

(56) References Cited

U.S. PATENT DOCUMENTS

| | | | |
|---|---|---|---|
| 2019/0207814 A1* | 7/2019 | Jain | G16H 20/00 |
| 2020/0280491 A1* | 9/2020 | Riedl | H04L 41/22 |

* cited by examiner

HIERARCHICAL HEALTH INDEX EVALUATION METHOD AND APPARATUS FOR INTELLIGENT SUBSTATION

TECHNICAL FIELD

The present disclosure relates to the field of electrical technologies, and in particular, to a hierarchical health index evaluation method and apparatus for an intelligent substation.

BACKGROUND

With the continuous improvement of automation and intelligentization of a substation control system, scales and complexity of system software and hardware are growing rapidly, causing increasing risks and challenges to safe and stable operation of the system.

As a key infrastructure related to national economy and people's livelihood in China, a power system has always been a primary target of hacker attacks. In 2010, the Stuxnet virus used the 0Day vulnerability of Siemens's industrial control system to destroy a large quantity of uranium enrichment facilities in Iran. In 2015, the Ukrainian power sector was attacked by malicious code, resulting in the failure of a plurality of substations and the blackout of more than 80,000 users, which caused great impact on the stability of social life. In 2019, there were many large-scale power outages in Venezuela, resulting in large-scale traffic congestion. Schools, hospitals, factories, and airports were seriously affected, causing great panic to the people. These events have sounded an alarm for network security of the power system. An intelligent substation is an important part of the power system, and its network security evaluation and protection means need to be improved.

However, an existing intelligent substation only carries out an information security test by collecting network security information, to give an early warning of network security, and cannot perform hierarchical health index evaluation on the intelligent substation to take security defense measures in advance.

SUMMARY

In view of this, to resolve the above technical problems, the present disclosure provides a hierarchical health index evaluation method and apparatus for an intelligent substation, to improve calculation accuracy of a whole-station health index.

According to a first aspect of the present disclosure, a hierarchical health index evaluation method for an intelligent substation is provided.

In an embodiment, the method includes:
obtaining a basic health index of a device based on static information and dynamic information of the device;
obtaining a device correlation based on a communication connection relationship between the device and another device, and correcting the basic health index of the device based on the device correlation to obtain a health index of the device;
obtaining a layer-based health index of a layer based on a device health index and a device importance weight of the layer;
obtaining a whole-station health index of an intelligent substation based on a layer-based health index of each layer and a sum of device importance weights of each layer; and regulating the intelligent substation based on a health index of each device in the intelligent substation, the layer-based health index of each layer, and the whole-station health index.

In an embodiment, the obtaining a device correlation based on a communication connection relationship between the device and another device, and correcting the basic health index of the device based on the device correlation to obtain a health index of the device includes:
obtaining a data packet exchanged between the device and the another device;
adding the another device to a correlated device list of the device based on IP address and MAC address information of the data packet, where the device is also added to a correlated device list of the another device;
sorting a correlated device in the correlated device list of the device in ascending order based on a basic health index of the correlated device to obtain a sorted correlated device;
determining a correlation weight of the correlated device based on a quantity of correlated devices in the correlated device list; and
correcting the basic health index of the device based on the basic health index and the correlation weight of the sorted correlated device to obtain the health index of the device.

In an embodiment, the obtaining a layer-based health index of a layer based on a device health index and a device importance weight of the layer includes:
obtaining a preset device importance weight;
calculating a proportion of a device importance weight of each device to a sum of device importance weights of a layer of the device, and obtaining the proportion of the device importance weight of each device; and
summating a product of a health index of each device and the proportion of the device importance weight of each device in the layer to obtain the layer-based health index of the layer.

In an embodiment, the method further includes: after the calculating a layer-based health index of a layer based on a device health index and a device importance weight of the layer, using the layer-based health index as a layer-based basic health index, and correcting the layer-based basic health index, which includes:
traversing all layers to obtain each device $A_{i,k}{}^l$ in each layer, where $A_{i,k}{}^l$ represents a $k^{th}$ device in an $i^{th}$ layer, and j is a positive integer;
calculating a layer-based correction weight $\delta_i^j$ between the $i^{th}$ layer and $j^{th}$ layer, initializing $\delta_i^j$ to 0, and traversing each correlated device $A_{i,k}{}^l$ of the device $A_{i,k}$, where the correlated device $A_{i,k}{}^l$ represents an $l^{th}$ correlated device of the $k^{th}$ device in the $i^{th}$ layer, and l is a positive integer; and when the correlated device $A_{i,k}{}^l$ belongs to the $j^{th}$ layer, and $\delta_i^{j+1}=\delta_i^j=w_{i,k}{}^l$, where $w_{i,k}{}^l$ represents a device importance weight corresponding to the correlated device $A_{i,k}{}^l$; and
correcting the layer-based basic health index based on the layer-based correction weight $\delta_i^j$ and the following formula:

$$CH_i = \text{Max}\left(0, BCH_i - \gamma_i \sum_{j=1}^{3} \frac{\delta_i^j}{\sum w_j}(100 - BCH_j)\right)$$

where $CH_i$ represents a corrected layer-based health index of the $i^{th}$ layer; $BCH_i$ represents a layer-based basic health index of the $i^{th}$ layer, and i is a positive integer; $\gamma_l$ represents layer-based correlation correction strength, and $\Sigma w_j$ represents a sum of device importance weights of all devices in the $j^{th}$ layer; and when i=j, the layer-based correction weight $\delta_i^j$ is 0.

In an embodiment, the obtaining a whole-station health index of an intelligent substation based on a layer-based health index of each layer and a sum of device importance weights of each layer includes:

calculating a sum of device importance weights of all devices in each layer, and obtaining a layer-based weight of a layer-based health index of a layer based on a proportion of a sum of device importance weights of the layer to a sum of device importance weights of all layers; and performing weighted summation on the layer-based health index and a layer-based weight of each layer to obtain the whole-station health index of the intelligent substation.

In an embodiment, the obtaining a basic health index of a device based on static information and dynamic information of the device includes:

identifying the static information of the device according to a vulnerability scanning method, a configuration verification method, and a fuzzy test method, and obtaining the static information of the device;

obtaining the dynamic information of the device based on an intrusion detection technology;

obtaining a preset static information weight and dynamic information weight of the device; and obtaining the basic health index of the device based on the static information, the dynamic information, the static information weight, and the dynamic information weight of the device.

In an embodiment, the static information includes at least one of information of an unfixed vulnerability, information of a wrong configuration parameter, information of an open high-risk port, and information of an open general network service; and the dynamic information includes at least one of information of an unknown connection, information of an unknown protocol, information of a malformed packet, and vulnerability use information.

According to a second aspect of the present disclosure, a hierarchical health index evaluation apparatus for an intelligent substation is provided.

In an embodiment, the apparatus includes:

a device basic health index calculation module, configured to obtain a basic health index of a device based on static information and dynamic information of the device;

a device health index calculation module, configured to obtain a device correlation based on a communication connection relationship between the device and another device, and correct the basic health index of the device based on the device correlation to obtain a health index of the device;

a layer-based health index calculation module, configured to obtain a layer-based health index of a layer based on a device health index and a device importance weight of the layer;

a whole-station health index calculation module, configured to obtain a whole-station health index of an intelligent substation based on a layer-based health index of each layer and a sum of device importance weights of each layer; and a global regulation module, configured to regulate the intelligent substation based on a health index of each device in the intelligent substation, the layer-based health index of each layer, and the whole-station health index.

A computer device or a system constituted by a plurality of computing devices includes a memory and a processor, where the memory stores a computer program, and the computer program is executed by the processor to perform the following steps:

obtaining a basic health index of a device based on static information and dynamic information of the device;

obtaining a device correlation based on a communication connection relationship between the device and another device, and correcting the basic health index of the device based on the device correlation to obtain a health index of the device;

obtaining a layer-based health index of a layer based on a device health index and a device importance weight of the layer; and obtaining a whole-station health index of an intelligent substation based on a layer-based health index of each layer and a sum of device importance weights of each layer.

A computer-readable storage medium storing a computer program is provided, where the computer program is executed by a processor to perform the following steps:

obtaining a basic health index of a device based on static information and dynamic information of the device;

obtaining a device correlation based on a communication connection relationship between the device and another device, and correcting the basic health index of the device based on the device correlation to obtain a health index of the device;

obtaining a layer-based health index of a layer based on a device health index and a device importance weight of the layer; and obtaining a whole-station health index of an intelligent substation based on a layer-based health index of each layer and a sum of device importance weights of each layer.

The above hierarchical health index evaluation method and apparatus for an intelligent substation, computer equipment, and storage medium evaluate and present a network security status of the intelligent substation from a device, a layer, and the whole station, which makes calculation of the whole-station health index more comprehensive and accurate; and correct the basic health index of the device based on the device correlation, which fully considers impact of diffusion of a network security risk caused by the device correlation on system security, and ensures more accurate health index calculation of the device. Based on device-based, layer-based, and whole-station health indexes of each intelligent substation, a health status of a same intelligent substation is continuously monitored and health indexes of different intelligent substations are horizontally compared to further realize global and tendency-based health status perception of an intelligent substation system. Finally, the intelligent substation is regulated based on a status perception result to enable the intelligent substation to operate safely and stably.

DETAILED DESCRIPTION

To make the objectives, technical solutions, and advantages of the present disclosure clearer, the present disclosure is further described in detail below with reference to the accompanying drawings and embodiments. It should be understood that the specific embodiments described herein are merely used to explain the present disclosure, rather than to limit the present disclosure.

The embodiments of the present disclosure provide a hierarchical health index evaluation method for an intelligent substation. In the method, an intelligent substation includes a plurality of layers. Each layer includes a plurality of devices to evaluate and present a network security status of the intelligent substation from a device, a layer, and the whole station, which makes calculation of a whole-station health index more comprehensive and accurate; and correct basic health indexes of the devices based on a device correlation, which fully considers impact of diffusion of a network security risk caused by the device correlation on system security, and ensures more accurate health index calculation of the devices.

Figure 1:
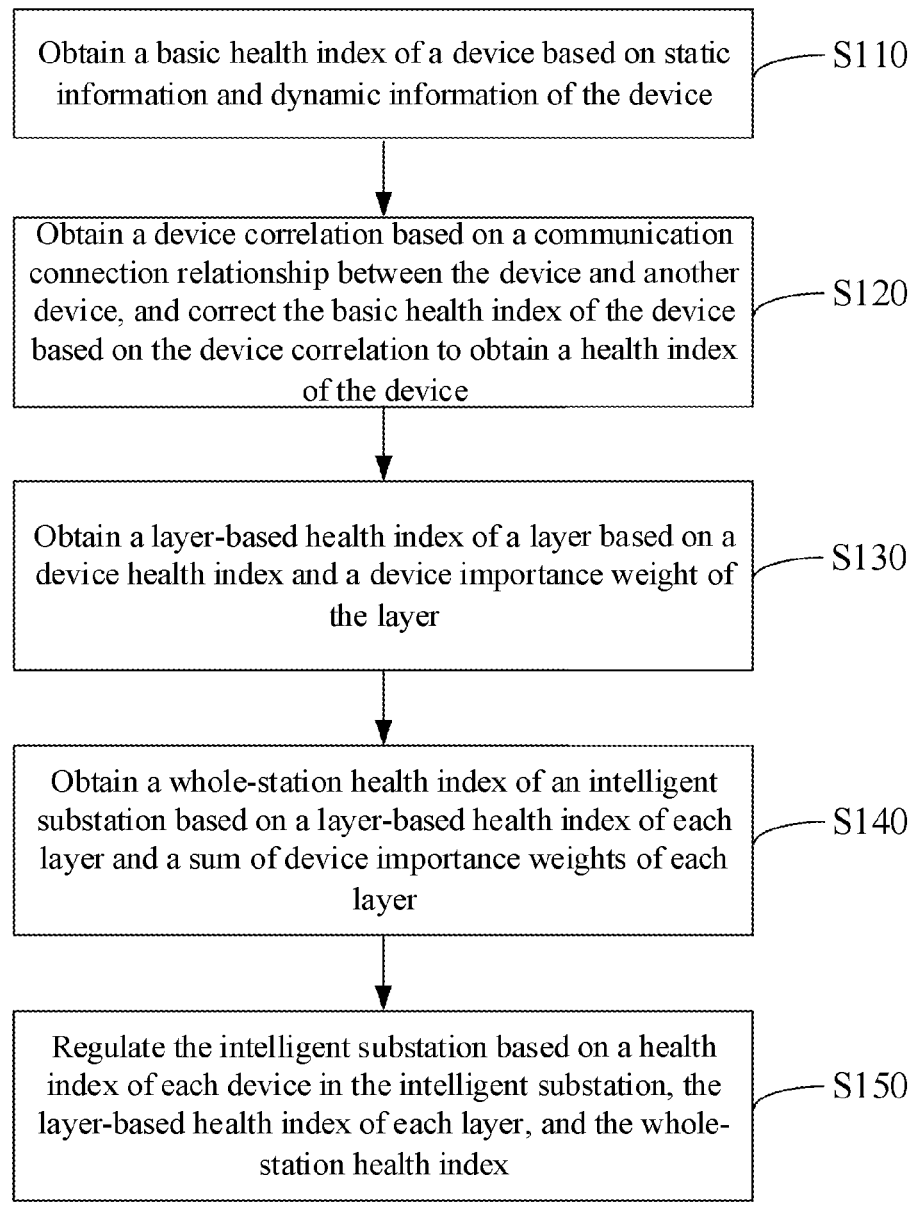
FIG. 1 is a schematic flowchart of a hierarchical health index evaluation method for an intelligent substation according to an embodiment.

In an embodiment, as shown in FIG. 1, a hierarchical health index evaluation method for an intelligent substation is provided, including the following steps.

S110: Obtain a basic health index of a device based on static information and dynamic information of the device.

The static information refers to a vulnerability factor on the device, and includes at least one of information of an unfixed vulnerability, information of a wrong configuration parameter, information of an open high-risk port, and information of an open general network service. The dynamic information refers to an abnormal behavior event of the device during system operation, and includes at least one of information of an unknown connection, information of an unknown protocol, information of a malformed packet, and vulnerability use information. Optionally, the basic health index of the device is obtained by performing analysis and operation on the static information and the dynamic information of the device based on weights of the dynamic information and the static information. Optionally, a larger value of the static information or the dynamic information leads to a lower basic health index of the device.

S120: Obtain a device correlation based on a communication connection relationship between the device and another device, and correct the basic health index of the device based on the device correlation to obtain a health index of the device.

The device correlation means that there is a communication link and a communication behavior between devices. The device correlation may be used by an attacker to use a device to launch an attack on a correlated device of the device. For a device, a device correlation is a potential risk of the device. Therefore, it should be controlled that only a necessary device is correlated, and safety of the correlated device needs to be ensured. The health index of the device is affected by a health index of a correlated device of the device. Therefore, the basic health index of the device is corrected based on the health index of the correlated device to obtain a more accurate health index of the device.

S130: Obtain a layer-based health index of a layer based on a device health index and a device importance weight of the layer.

Based on the obtained device health index, the device importance weight is obtained based on importance of a device in each layer of an intelligent substation. A device health index of each layer is weighted and averaged to obtain a layer-based health index of the corresponding layer.

S140: Obtain a whole-station health index of the intelligent substation based on a layer-based health index of each layer and a sum of device importance weights of each layer.

The obtained layer-based health index is weighted and averaged based on a sum of device importance weights corresponding to devices in each layer to obtain the whole-station health index.

S150: Regulate the intelligent substation based on a health index of each device in the intelligent substation, the layer-based health index of each layer, and the whole-station health index.

The hierarchical health index evaluation method for an intelligent substation in this embodiment evaluates and presents a network security status of the intelligent substation from the device, the layer, and the whole station, which makes calculation of the whole-station health index more comprehensive and accurate; and corrects the basic health index of the device based on the device correlation, which fully considers impact of diffusion of a network security risk caused by the device correlation on system security, and ensures more accurate health index calculation of the device. Based on device-based, layer-based, and whole-station health indexes of each intelligent substation, a health status of a same intelligent substation is continuously monitored and health indexes of different intelligent substations are horizontally compared to further realize global and tendency-based health status perception of an intelligent substation system. Finally, the intelligent substation is regulated based on a status perception result to enable the intelligent substation to operate safely and stably.

In an embodiment, the obtaining a device correlation based on a communication connection relationship between the device and another device, and correcting the basic health index of the device based on the device correlation to obtain a health index of the device includes: obtaining a data packet exchanged between the device and the another device; adding the another device to a correlated device list of the device based on IP address and MAC address information of the data packet, where the device is also added to a correlated device list of the another device; sorting a correlated device in the correlated device list of the device in ascending order based on a basic health index of the correlated device to obtain a sorted correlated device; determining a correlation weight of the correlated device based on a quantity of correlated devices in the correlated device list; and correcting the basic health index of the device based on the basic health index and the correlation weight of the sorted correlated device to obtain the health index of the device.

Optionally, the another device is added to the correlated device list of the device by traffic monitoring and deep packet parsing technologies based on the IP address and MAC address information of the data packet. The device is also added to the correlated device list of the another device if it does not exist in the correlated device list of the another device. For example, when it is monitored that a device $A_1$ sends a data packet to a device $A_2$, the device $A_2$ is added to a correlated device list of the device $A_1$, and the device $A_1$ is added to a correlated device list of the device $A_2$. A correlated device list of a device $A_i$ is represented by $\{A_i^j, j=1, \ldots, N_i\}$ where $A_i^j$ represents a $j^{th}$ correlated device of the device $A_i$, and $N_i$ represents a quantity of correlated devices of the device $A_i$. Due to a low communication frequency between some devices, device correlation identification needs to be performed continuously to identify a new device correlation constantly, and update a corresponding correlated device list.

After a basic health index of each device in a layer is obtained, the basic health index of the device is corrected based on the basic health index of the correlated device and the device correlation. Specifically, $BH_i^j$ is used to represent a basic health index of the $j^{th}$ correlated device of the device $A_i$, and i and j are positive integers. Sorting is performed in ascending order based on the basic health index of the correlated device, namely, $BH_i^j \leq BH_i^{j+1}$, $\forall j=1, \ldots, N_i-1$. A health index of the device $A_i$ is calculated according to the following formula:

$$H_i = \text{Max}\left(0, BH_i - \gamma_a \sum_{j=1}^{N_i} \frac{2(N_i - j + 1)}{N_i(N_i + 1)}(100\_BH_i^j)\right)$$

In the above formula, $H_i$ represents the health index of the device $A_i$; $BH_i$ represents a basic health index of the device $A_i$; $N_i$ represents the quantity of correlated devices of the device $A_i$; $\gamma_a$ represents device correlation correction strength, a larger value of $\gamma a$ leads to larger device correlation correction strength, and when $\gamma_a=0$, the basic health index of the device is not corrected; and $A_i$ represents an $i^{th}$ device. Basic health indexes of all correlated devices are weighted and averaged according to the above calculation formula. A correlated device with a lower basic health index has a larger weight, and then the basic health index of the device is corrected. In the above calculation formula, when a device has few correlated devices, weights corresponding to the correlated devices are distributed in a centralized manner and large; when a device has many correlated devices, weights corresponding to the correlated devices are evenly distributed and small. Optionally, the device correlation correction strength $\gamma_a$ is divided into low correction strength, medium correction strength, and high correction strength, where $\gamma_a=0$ indicates the low correction strength, $\gamma_a=0.1$ indicates the medium correction strength, and $\gamma_a=0.3$ indicates the high correction strength. Certainly, the device correlation correction strength $\gamma_a$ may also be obtained based on an empirical value.

In an embodiment, the obtaining a layer-based health index of a layer based on a device health index and a device importance weight of the layer includes: obtaining a preset device importance weight; calculating a proportion of a device importance weight of each device to a sum of device importance weights of a layer of the device, and obtaining the proportion of the device importance weight of each device; and summating a product of a health index of each device and the proportion of the device importance weight of each device in the layer to obtain the layer-based health index of the layer.

Optionally, a device is added to a corresponding layer based on a layer design characteristic of the intelligent substation, for example, $A_{i,j}$ represents a $j^{th}$ device of an $i^{th}$ layer. A device importance weight $w_j$ corresponding to the device is obtained based on importance of the device, where $w_j$ represents the device importance weight of the $j^{th}$ device. The layer-based basic health index is calculated according to the following formula:

$$BCH_i = \frac{\sum_{j=1}^{N_{C_i}}(w_j \times H_j)}{\sum_{j=1}^{N_{C_i}} w_j}$$

In the above formula, $BCH_i$ represents a layer-based basic health index of the $i^{th}$ layer, $BCH_1$ represents a basic health index of a station control layer, $BCH_2$ represents a basic health index of a space layer, $BCH_3$ represents a basic health index of a process layer, $NC_i$ represents a quantity of devices in the $i^{th}$ layer, $NC_1$ represents a quantity of devices in the station control layer, $NC_2$ represents a quantity of devices in the space layer, $NC_3$ represents a quantity of devices in the process layer, and $H_j$ represents a health index of the $j^{th}$ device, where i and j are positive integers. In this embodiment, the intelligent substation is divided into a total of three layers: the station control layer, the space layer, and the process layer. In other embodiments, the intelligent substation may alternatively be divided into layers of another quantity.

Optionally, if the layer-based health index is not corrected, the layer-based basic health index of the layer can be directly used as the layer-based health index of the layer.

In an embodiment, after the layer-based health index of the layer is obtained based on the device health index and the device importance weight of the layer, the layer-based health index is used as the layer-based basic health index and is corrected. Specifically, all layers are traversed to obtain each device $A_{i,k}$ in each layer, where $A_{i,k}$ represents a $k^{th}$ device in the $j^{th}$ layer, and j is a positive $\delta_i^j$ is initialized to 0, and each correlated device $A_{i,k}^l$ of the device $A_{i,k}$ is traversed, where the correlated device $A_{i,k}^l$ represents an $l^{th}$ correlated device of the $k^{th}$ device in the $i^{th}$ layer; and when the correlated device $A_{i,k}^l$ belongs to the $j^{th}$ layer, and i≠j, $\delta_i^{j+1}=\delta_i^j+w_{i,k}^l$, where $w_{i,k}^l$ represents a device importance weight corresponding to the correlated device $A_{i,k}^l$; and the layer-based basic health index is corrected based on the layer-based correction weight $\delta_i^j$ and the following formula:

$$CH_i = \text{Max}\left(0, BCH_i - \gamma_l \sum_{j=1}^{3} \frac{\delta_i^j}{\sum w_j}(100 - BCH_j)\right)$$

In the above formula, $CH_i$ represents a corrected layer-based health index of the $i^{th}$ layer; $BCH_i$ represents the layer-based basic health index of the $i^{th}$ layer, and i is a positive integer; $\gamma_l$ represents layer-based correlation correction strength, a larger value of $\gamma_l$ leads to larger layer-based correlation correction strength, and $\Sigma w_j$ represents a sum of device importance weights of all devices in the $j^{th}$ layer; and when i=j, the layer-based correction weight $\delta_i^j$ is 0. In the above formula, values 1, 2, and 3 of j respectively correspond to the station control layer, the space layer, and the process layer of the intelligent substation. Certainly, j is a positive integer. Those skilled in the art may set a corresponding quantity of layers based on a layering need. Optionally, the layer-based correlation correction strength $\gamma_l$ is divided into low correction strength, medium correction strength, and high correction strength, where $\gamma_l=0$ indicates the low correction strength, $\gamma_l=0.05$ indicates the medium correction strength, and $\gamma_l=0.1$ indicates the high correction strength. Optionally, the layer-based correlation correction strength $\gamma_i$ may also be obtained based on an empirical value.

In this embodiment, the layer-based basic health index is corrected based on the device correlation to ensure that the calculation of the layer-based health index takes into account impact of linkage between different layers of the intelligent substation due to the device correlation, so as to make a calculation result more accurate.

In an embodiment, the obtaining a whole-station health index of an intelligent substation based on a layer-based health index of each layer and a sum of device importance weights of each layer includes: calculating a sum of device importance weights of all devices in each layer, and obtaining a layer-based weight of a layer-based health index of a layer based on a proportion of a sum of device importance weights of the layer to a sum of device importance weights of all layers; and performing weighted summation on the layer-based health index and a layer-based weight of each layer to obtain the whole-station health index of the intelligent substation.

Optionally, the whole-station health index of the intelligent substation is calculated according to the following formula:

$$QH = \sum_{i=1}^{3} \frac{\sum w_i}{\sum w} CH_i$$

In the above formula, QH represents the whole-station health index of the intelligent substation, $\Sigma w$ represents a sum of device importance weights of all devices in all the layers, $\Sigma w_i$ represents a sum of device importance weights of all devices in the $i^{th}$ layer, and $CH_i$ represents a layer-based health index of the $i^{th}$ layer. In the above formula, values 1, 2, and 3 of i respectively correspond to the station control layer, the space layer, and the process layer of the intelligent substation. Certainly, i is a positive integer. Those skilled in the art may set a corresponding quantity of layers based on a layering need.

In an embodiment, the obtaining a basic health index of a device based on static information and dynamic information of the device includes: identifying the static information of the device according to a vulnerability scanning method, a configuration verification method, and a fuzzy test method, and obtaining the static information of the device; obtaining the dynamic information of the device based on an intrusion detection technology; obtaining a preset static information weight and dynamic information weight of the device; and calculating the basic health index of the device based on the static information, the dynamic information, the static information weight, and the dynamic information weight of the device.

Optionally, a device running in the intelligent substation system is automatically identified by an active scanning and device fingerprint identification technology to form a device set. The device set is represented by $\{A_i, i=1, \ldots, N\}$, where $A_i$ represents the $i^{th}$ device, and N represents a quantity of devices.

Optionally, the static information of the device is identified through technical means such as vulnerability scanning, configuration verification, and fuzzy test. Static information of the device $A_i$ is represented by $\{S_i^j, j=1, \ldots, N_i^s\}$, where $S_i^j$ represents a $j^{th}$ piece of static information of the device $A_i$, and $N_i^s$ represents a quantity of pieces of static information of the device $A_i$. A corresponding weight of the static information $S_i^j$ is represented by $s_i^j$. The weight is related to a risk and a severity of the static information. Static information with a higher risk and severity has a larger weight.

Optionally, the dynamic information of the device is identified by intrusion detection technologies such as a blacklist, a whitelist, and a security baseline. Dynamic information of the device $A_i$ is represented by $\{D_i^j, j=1, \ldots, N_i^d\}$, where $D_i^j$ represents a $j^{th}$ piece of dynamic information of the device $A_i$, and $N_i^d$ represents a quantity of pieces of dynamic information of the device $A_i$. A corresponding weight of the dynamic information $D_i^j$ is represented by $d_i^j$. The weight is related to a risk and a severity of the dynamic information. Dynamic information with a higher risk and severity has a larger weight.

Optionally, the basic health index of the device is calculated according to the following formula:

$$BH_i = 100 - \alpha_i^s \times \text{Max}\left(100, \sum_{j}^{N_i^s} s_i^j \times S_i^j\right) - \alpha_i^d \times \text{Max}\left(100, \sum_{j}^{N_i^d} d_i^j \times D_i^j\right)$$

In the above formula, $BH_i$ represents the basic health index of the device, $\alpha_i^s$ represents the static information weight, $\alpha_i^d$ represents the dynamic information weight, and values of $\alpha_i^s$ and $\alpha_i^d$ each range from 0 to 1, and $\alpha_i^s + \alpha_i^d = 1$. A user may dynamically adjust proportions of the static information and the dynamic information in the calculation of the basic health index of the device based on an actual evaluation need. $N_i^s$ represents the quantity of pieces of static information of the device $A_i$, $S_i^j$ represents the $j^{th}$ piece of static information of the device $A_i$, the corresponding weight of the static information is represented by $s_i^j$, $N_i^d$ represents the quantity of pieces of dynamic information of the device $A_i$, $D_i^j$ represents the $j^{th}$ piece of dynamic information of the device $A_i$, and the corresponding weight of the dynamic information $D_i^j$ is represented by $d_i^j$.

In an embodiment, the static information includes at least one of information of an unfixed vulnerability, information of a wrong configuration parameter, information of an open high-risk port, and information of an open general network service.

In an embodiment, the dynamic information includes at least one of information of an unknown connection, information of an unknown protocol, information of a malformed packet, and vulnerability use information.

It should be understood that although the steps in the flowchart of FIG. 1 are shown in sequence as indicated by the arrows, these steps are not necessarily performed in sequence as indicated by the arrows. Unless explicitly stated herein, the execution of these steps is not strictly limited in sequence, and these steps may be executed in other sequences. Moreover, at least some steps in FIG. 1 may include a plurality of substeps or a plurality of stages, which are not necessarily executed at the same time, but may be executed at different moments. The execution order of these substeps or stages is not necessarily sequential, and these substeps or stages may be executed alternately with other steps or at least some substeps or stages of other steps.

Figure 2:
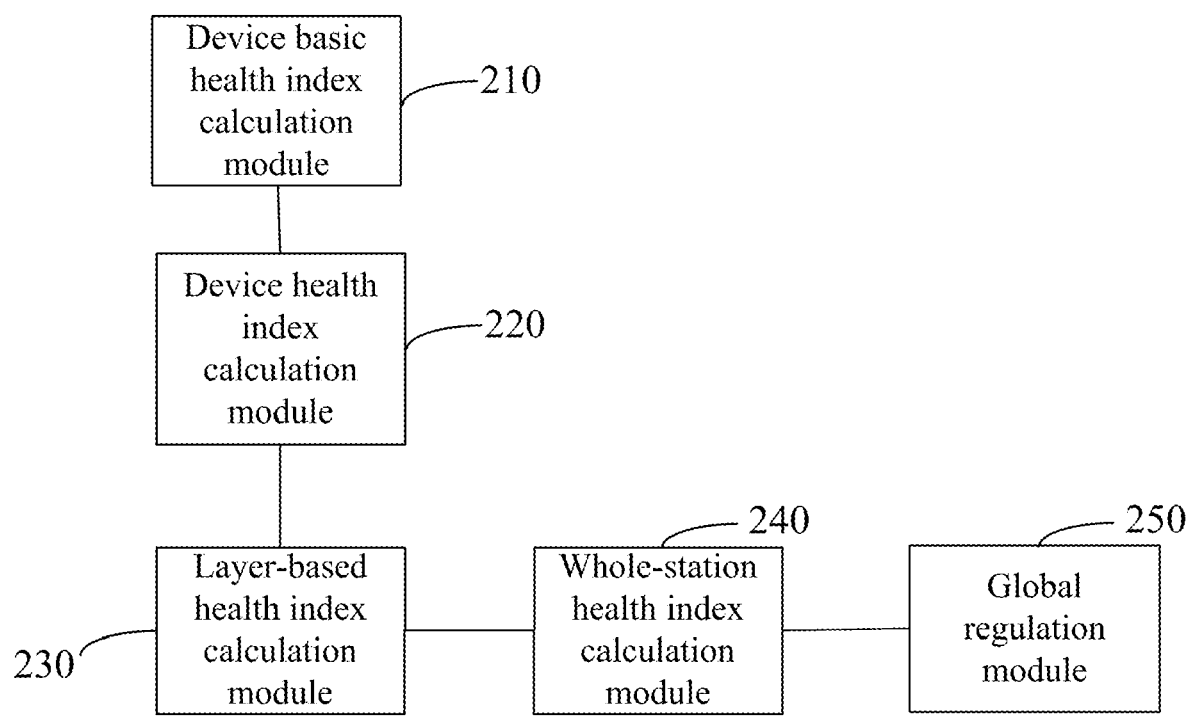
FIG. 2 is a structural block diagram of a hierarchical health index evaluation apparatus for an intelligent substation according to an embodiment.

In an embodiment, as shown in FIG. 2, a hierarchical health index evaluation apparatus for an intelligent substation is provided, including a device basic health index calculation module 210, a device health index calculation module 220, a layer-based health index calculation module 230, and a whole-station health index calculation module 240.

The device basic health index calculation module 210 is configured to obtain a basic health index of a device based on static information and dynamic information of the device.

The device health index calculation module 220 is configured to obtain a device correlation based on a communication connection relationship between the device and another device, and correct the basic health index of the device based on the device correlation to obtain a health index of the device.

The layer-based health index calculation module 230 is configured to calculate a layer-based health index of a layer based on a device health index and a device importance weight of the layer.

The whole-station health index calculation module 240 is configured to obtain a whole-station health index of an intelligent substation based on a layer-based health index of each layer and a sum of device importance weights of each layer.

A global regulation module 250 is configured to regulate the intelligent substation based on a health index of each device in the intelligent substation, the layer-based health index of each layer, and the whole-station health index.

In an embodiment, the device health index calculation module 220 includes: a data packet obtaining unit, configured to obtain a data packet exchanged between the device and the another device; a correlated device list adding unit, configured to add the another device to a correlated device list of the device based on IP address and MAC address information of the data packet, where the device is also added to a correlated device list of the another device; a sorting unit, configured to sort a correlated device in the correlated device list of the device in ascending order based on a basic health index of the correlated device to obtain a sorted correlated device; a correlation weight determining unit, configured to determine a correlation weight of the correlated device based on a quantity of correlated devices in the correlated device list; and a device health index calculation unit, configured to correct the basic health index of the device based on the basic health index and the correlation weight of the sorted correlated device to obtain the health index of the device.

In an embodiment, the layer-based health index calculation module 230 includes: a device importance weight obtaining unit, configured to obtain a preset device importance weight; a proportion calculation unit, configured to calculate a proportion of a device importance weight of each device to a sum of device importance weights of a layer of the device, and obtain the proportion of the device importance weight of each device; and a layer-based health index calculation unit, configured to summate a product of a health index of each device and the proportion of the device importance weight of each device in the layer to obtain the layer-based health index of the layer.

In an embodiment, the hierarchical health index evaluation apparatus for an intelligent substation further includes a layer-based health index correction module, configured to use, as a layer-based basic health index, the layer-based health index obtained by the layer-based health index calculation module 230, and correct the layer-based basic health index. The layer-based health index correction module is specifically configured to: traverse all layers to obtain each device $A_{i,k}$ in each layer, where $A_{i,k}$ represents a $k^{th}$ device in an $i^{th}$ layer, and j is a positive integer; calculate a layer-based correction weight $\delta_i^j$ between the $i^{th}$ layer and a $j^{th}$ layer, initialize $\delta_i^j$ to 0, and traverse each correlated device $A_{i,k}^l$ of the device $A_{i,k}$, where the correlated device $A_{i,k}^l$ represents an $l^{th}$ correlated device of the $k^{th}$ device in the $i^{th}$ layer, and /is a positive integer; and when the correlated device $A_{i,k}^l$ belongs to the $j^{th}$ layer, and i≠j $\delta_i^{j+1}=\delta_i^j+w_{i,k}^l$, where $w_{i,k}^l$ represents a device importance weight corresponding to the correlated device $A_{i,k}^l$; and correct the layer-based basic health index based on the layer-based correction weight $\delta_i^j$ and the following formula:

$$CH_i = \text{Max}\left(0, BCH_i - \gamma_l \sum_{j=1}^{3} \frac{\delta_i^j}{\sum w_j}(100 - BCH_j)\right)$$

In the above formula, $CH_i$ represents a corrected layer-based health index of the $i^{th}$ layer; $BCH_i$ represents a layer-based basic health index of the $i^{th}$ layer, and i is a positive integer; $\gamma_l$ represents layer-based correlation correction strength, and $\Sigma w_j$ represents a sum of device importance weights of all devices in the $j^{th}$ layer; and when i=j, the layer-based correction weight $\delta_i^j$ is 0.

In an embodiment, the whole-station health index calculation module 240 includes: a layer-based weight calculation unit, configured to calculate a sum of device importance weights of all devices in each layer, and obtain a layer-based weight of a layer-based health index of a layer based on a proportion of a sum of device importance weights of the layer to a sum of device importance weights of all layers; and a whole-station health index calculation unit, configured to perform weighted summation on the layer-based health index and a layer-based weight of each layer to obtain the whole-station health index of the intelligent substation.

In an embodiment, the device basic health index calculation module 210 includes: a static information obtaining unit, configured to identify the static information of the device according to a vulnerability scanning method, a configuration verification method, and a fuzzy test method, and obtain the static information of the device; a dynamic information obtaining unit, configured to obtain the dynamic information of the device based on an intrusion detection technology; an information weight obtaining unit, configured to obtain a preset static information weight and dynamic information weight of the device; and a basic device health index calculation unit, configured to calculate the basic health index of the device based on the static information, the dynamic information, the static information weight, and the dynamic information weight of the device.

For specific limitations of the hierarchical health index evaluation apparatus for an intelligent substation, reference may be made to the above limitations of the hierarchical health index evaluation method for an intelligent substation, and details are not described herein again. Various modules in the above hierarchical health index evaluation apparatus for an intelligent substation may be implemented fully or partially through software, hardware, and a combination thereof. Each of the foregoing modules may be embedded in or independent of a processor in a computer device in a form of hardware, or may be stored in a memory in the computer device in a form of software to enable the processor to conveniently call and execute an operation corresponding to each of the foregoing modules.

Figure 3:
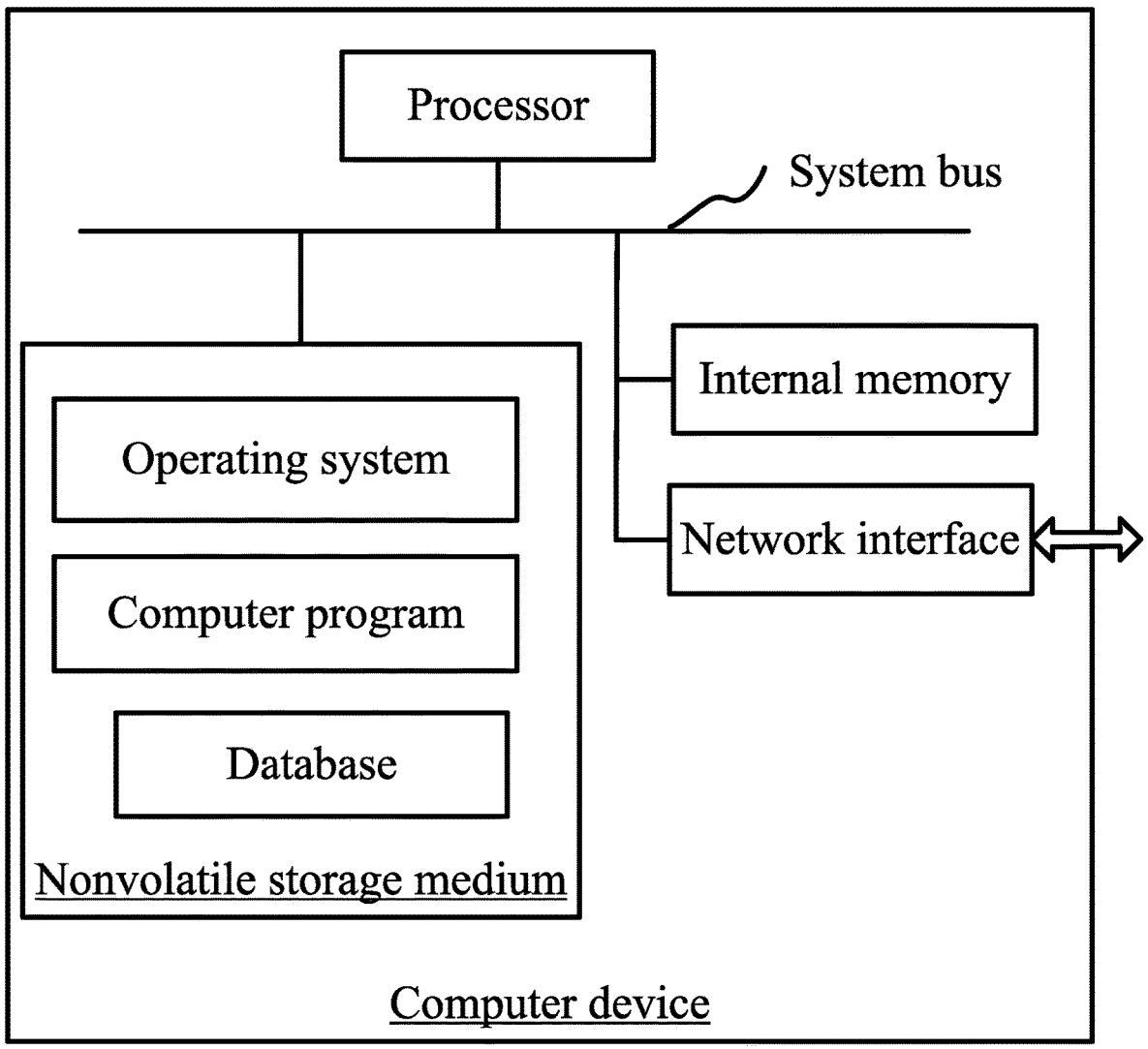
FIG. 3 is an internal structural diagram of a computer device according to an embodiment.

In an embodiment, a computer device or a system constituted by a plurality of computing devices is provided. The computer device may be a server, and an internal structure thereof may be as shown in FIG. 3. The computer device includes a processor, a memory, and a network interface that are connected through a system bus. The processor of the computer device is configured to provide calculation and control capabilities. The memory of the computer device includes a nonvolatile storage medium and an internal memory. The nonvolatile storage medium stores an operating system, a computer program, and a database. The internal memory provides an environment for operation of the operating system and the computer program in the nonvolatile storage medium. The database of the computer device is configured to store static and dynamic information and data. The network interface of the computer device is configured to communicate with an external terminal through a network. The computer program is executed by the processor to perform the steps of the above hierarchical health index evaluation method for an intelligent substation.

Those skilled in the art may understand that the structure shown in FIG. 3 is only a block diagram of a part of the structure related to the solution of the present disclosure and does not constitute a limitation on a computer device to which the solution of the present disclosure is applied. Specifically, the computer device may include more or less components than those shown in the figure, or combine some components, or have different component arrangements.

In an embodiment, a computer device is further provided, including a memory and a processor. The memory stores a computer program. The processor executes the computer program to perform the steps of the above hierarchical health index evaluation method for an intelligent sub station.

In an example, a computer-readable storage medium storing a computer program is provided. The computer program is executed by a processor to perform the steps of the above hierarchical health index evaluation method for an intelligent substation.

Those of ordinary skill in the art may understand that all or some of the procedures in the method of the foregoing embodiment may be implemented by a computer program instructing related hardware. The computer program may be stored in a nonvolatile computer-readable storage medium. When the computer program is executed, the procedures in the embodiment of the foregoing method may be performed. Any reference used for a memory, a storage, a database, or other media used in various embodiments provided in the present disclosure may include a nonvolatile memory and/or a volatile memory. The nonvolatile memory may include a read-only memory (ROM), a tape, a floppy disk, a flash memory, an optical memory, or the like. The volatile memory may include a random access memory (RAM) or an external cache memory. As description rather than limitation, the RAM may be in a plurality of forms, such as a static random access memory (SRAM), a dynamic random access memory (DRAM), or the like.

The technical characteristics of the above embodiments can be employed in arbitrary combinations. In an effort to provide a concise description of these embodiments, all possible combinations of all technical characteristics of the embodiments may not be described. However, these combinations of technical characteristics should be construed as disclosed in the description as long as no contradiction occurs.

The above embodiments are merely intended to describe several implementations of the present disclosure, and the description thereof is more specific and detailed, but is not to be construed as a limitation on the patentable scope of the present disclosure. It should be noted that those of ordinary skill in the art can further make variations and improvements without departing from the concept of the present disclosure. These variations and improvements all fall within the protection scope of the present disclosure. Therefore, the protection scope of the present disclosure should be subject to the protection scope defined by the claims.

The invention claimed is:

1. A hierarchical health index evaluation method for an intelligent substation, comprising the following steps:
   obtaining a basic health index of a device based on static information and dynamic information of the device;
   obtaining a device correlation based on a communication connection relationship between the device and another device, and correcting the basic health index of the device based on the device correlation to obtain a health index of the device;
   obtaining a layer-based health index of a layer based on a device health index and a device importance weight of the layer;
   obtaining a whole-station health index of an intelligent substation based on a layer-based health index of each layer and a sum of device importance weights of each layer; and
   regulating the intelligent substation based on a health index of each device in the intelligent substation, the layer-based health index of each layer, and the whole-station health index.

2. The method according to claim 1, wherein the obtaining a device correlation based on a communication connection relationship between the device and another device, and correcting the basic health index of the device based on the device correlation to obtain a health index of the device comprises:
   obtaining a data packet exchanged between the device and the another device;
   adding the another device to a correlated device list of the device based on IP address and MAC address information of the data packet, wherein the device is also added to a correlated device list of the another device;
   sorting a correlated device in the correlated device list of the device in ascending order based on a basic health index of the correlated device to obtain a sorted correlated device;
   determining a correlation weight of the correlated device based on a quantity of correlated devices in the correlated device list; and
   correcting the basic health index of the device based on the basic health index and the correlation weight of the sorted correlated device to obtain the health index of the device.

3. The method according to claim 1, wherein the obtaining a layer-based health index of a layer based on a device health index and a device importance weight of the layer comprises:
   obtaining a preset device importance weight;
   calculating a proportion of a device importance weight of each device to a sum of device importance weights of a layer of the device, and obtaining the proportion of the device importance weight of each device; and
   summating a product of a health index of each device and the proportion of the device importance weight of each device in the layer to obtain the layer-based health index of the layer.

4. The method according to claim 1, wherein the method comprises: after the obtaining a layer-based health index of a layer based on a device health index and a device importance weight of the layer, using the layer-based health index as a layer-based basic health index, and correcting the layer-based basic health index, which comprises:

traversing all layers to obtain each device $A_{i,k}$ in each layer, wherein $A_{i,k}$ represents a $k^{th}$ device in an $i^{th}$ layer, and j is a positive integer;

calculating a layer-based correction weight $\delta_i^j$ between the $i^{th}$ layer and a $j^{th}$ layer, initializing to $\delta_i^j$ to 0, and traversing each correlated device $A_{i,k}^l$ of the device $A_{i,k}$, wherein the correlated device $A_{i,k}^l$ represents an $l^{th}$ correlated device of the $k^{th}$ device in the $i^{th}$ layer, and l is a positive integer; and when the correlated device $A_{i,k}^l$ belongs to the $j^{th}$ layer, and i≠j, $\delta_i^{j+1}=\delta_i^j+w_{i,k}^l$, wherein $w_{i,k}^l$ represents a device importance weight corresponding to the correlated device $A_{i,k}^l$; and correcting the layer-based basic health index based on the layer-based correction weight $\delta_i^j$ and the following formula:

$$CH_i = \text{Max}\left(0, BCH_i - \gamma_l \sum_{j=1}^{3} \frac{\delta_i^j}{\sum w_j}(100 - BCH_j)\right)$$

wherein $CH_i$ represents a corrected layer-based health index of the $i^{th}$ layer; $BCH_i$ represents a layer-based basic health index of the $i^{th}$ layer, and i is a positive integer; $\gamma_l$ represents layer-based correlation correction strength, and $\tau w_j$ represents a sum of device importance weights of all devices in the $j^{th}$ layer; and when i=j, the layer-based correction weight $\delta_i^j$ is 0.

5. The method according to claim 1, wherein the obtaining a whole-station health index of an intelligent substation based on a layer-based health index of each layer and a sum of device importance weights of each layer comprises:

calculating a sum of device importance weights of all devices in each layer, and obtaining a layer-based weight of a layer-based health index of a layer based on a proportion of a sum of device importance weights of the layer to a sum of device importance weights of all layers; and performing weighted summation on the layer-based health index and a layer-based weight of each layer to obtain the whole-station health index of the intelligent substation.

6. The method according to claim 1, wherein the obtaining a basic health index of a device based on static information and dynamic information of the device comprises:

identifying the static information of the device according to a vulnerability scanning method, a configuration verification method, and a fuzzy test method, and obtaining the static information of the device;

obtaining the dynamic information of the device based on an intrusion detection technology;

obtaining a preset static information weight and dynamic information weight of the device; and obtaining the basic health index of the device based on the static information, the dynamic information, the static information weight, and the dynamic information weight of the device.

7. The method according to claim 1, wherein
the static information comprises at least one of information of an unfixed vulnerability, information of a wrong configuration parameter, information of an open high-risk port, and information of an open general network service; and
the dynamic information comprises at least one of information of an unknown connection, information of an unknown protocol, information of a malformed packet, and vulnerability use information.

8. A computer device or a system constituted by a plurality of computing devices, comprising a memory and a processor, wherein the memory stores a computer program, and the computer program is executed by the processor to perform steps of the method according to claim 1.

9. A computer-readable storage medium storing a computer program, wherein the computer program is executed by a processor to perform steps of the method according to claim 1.

10. A hierarchical health index evaluation apparatus for an intelligent substation, wherein the apparatus comprises:

a device basic health index calculation module, configured to obtain a basic health index of a device based on static information and dynamic information of the device;

a device health index calculation module, configured to obtain a device correlation based on a communication connection relationship between the device and another device, and correct the basic health index of the device based on the device correlation to obtain a health index of the device;

a layer-based health index calculation module, configured to obtain a layer-based health index of a layer based on a device health index and a device importance weight of the layer;

a whole-station health index calculation module, configured to obtain a whole-station health index of an intelligent substation based on a layer-based health index of each layer and a sum of device importance weights of each layer; and a global regulation module, configured to regulate the intelligent substation based on a health index of each device in the intelligent substation, the layer-based health index of each layer, and the whole-station health index.

11. The hierarchical health index evaluation apparatus for an intelligent substation according to claim 10, wherein
the device health index calculation module comprises:

a data packet obtaining unit, configured to obtain a data packet exchanged between the device and the another device;

a correlated device list adding unit, configured to add the another device to a correlated device list of the device based on IP address and MAC address information of the data packet, wherein the device is also added to a correlated device list of the another device;

a sorting unit, configured to sort a correlated device in the correlated device list of the device in ascending order based on a basic health index of the correlated device to obtain a sorted correlated device;

a correlation weight determining unit, configured to determine a correlation weight of the correlated device based on a quantity of correlated devices in the correlated device list; and a device health index calculation unit, configured to correct the basic health index of the device based on the basic health index and the correlation weight of the sorted correlated device to obtain the health index of the device.

12. The hierarchical health index evaluation apparatus for an intelligent substation according to claim 10, wherein
the layer-based health index calculation module comprises:

a device importance weight obtaining unit, configured to obtain a preset device importance weight;

a proportion calculation unit, configured to calculate a proportion of a device importance weight of each device to a sum of device importance weights of a layer of the device, and obtain the proportion of the device importance weight of each device; and a layer-based health index calculation unit, configured to summate a product of a health index of each device and the proportion of the device importance weight of each device in the layer to obtain the layer-based health index of the layer.

13. The hierarchical health index evaluation apparatus for an intelligent substation according to claim 10, further comprising:

a layer-based health index correction module, configured to use, as a layer-based basic health index, the layer-based health index obtained by the layer-based health index calculation module, and correct the layer-based basic health index, wherein the layer-based health index correction module is specifically configured to:

traverse all layers to obtain each device $A_{i,k}$ in each layer, wherein $A_{i,k}$ represents a $k^{th}$ device in an $i^{th}$ layer, and j is a positive integer;

calculate a layer-based correction weight $\delta_i^j$ between the $i^{th}$ layer and a $j^{th}$ layer, initialize $\delta_i^j$ to 0, and traverse each correlated device $A_{i,k}^l$ of the device $A_{i,k}$, wherein the correlated device $A_{i,k}^l$ represents an $l^{th}$ correlated device of the $k^{th}$ device in the $i^{th}$ layer, and l is a positive integer; and when the correlated device $A_{i,k}^l$ belongs to the $j^{th}$ layer, and i≠j, $\delta_i^{j+1} = \delta_i^j + w_{i,k}^l$, wherein $w_{i,k}^l$ represents a device importance weight corresponding to the correlated device $A_{i,k}^l$; and correct the layer-based basic health index based on the layer-based correction weight $\delta_i^j$ and the following formula:

$$CH_i = \text{Max}\left(0, BCH_i - \gamma_l \sum_{j=1}^{3} \frac{\delta_i^j}{\sum w_j}(100 - BCH_j)\right)$$

wherein $CH_i$ represents a corrected layer-based health index of the $i^{th}$ layer; $BCH_i$ represents a layer-based basic health index of the $i^{th}$ layer, and i is a positive integer; $\gamma_l$ represents layer-based correlation correction strength, and $\Sigma w_j$ represents a sum of device importance weights of all devices in the $j^{th}$ layer; and when i=j, the layer-based correction weight $\delta_i^j$ is 0.

14. The hierarchical health index evaluation apparatus for an intelligent substation according to claim 10, wherein the whole-station health index calculation module comprises:

a layer-based weight calculation unit, configured to calculate a sum of device importance weights of all devices in each layer, and obtain a layer-based weight of a layer-based health index of a layer based on a proportion of a sum of device importance weights of the layer to a sum of device importance weights of all layers; and a whole-station health index calculation unit, configured to perform weighted summation on the layer-based health index and a layer-based weight of each layer to obtain the whole-station health index of the intelligent substation.

15. The hierarchical health index evaluation apparatus for an intelligent substation according to claim 10, wherein the device basic health index calculation module comprises:

a static information obtaining unit, configured to identify the static information of the device according to a vulnerability scanning method, a configuration verification method, and a fuzzy test method, and obtain the static information of the device;

a dynamic information obtaining unit, configured to obtain the dynamic information of the device based on an intrusion detection technology;

an information weight obtaining unit, configured to obtain a preset static information weight and dynamic information weight of the device; and a basic device health index calculation unit, configured to calculate the basic health index of the device based on the static information, the dynamic information, the static information weight, and the dynamic information weight of the device.

16. The hierarchical health index evaluation apparatus for an intelligent substation according to claim 10, wherein the static information comprises at least one of information of an unfixed vulnerability, information of a wrong configuration parameter, information of an open high-risk port, and information of an open general network service; and the dynamic information comprises at least one of information of an unknown connection, information of an unknown protocol, information of a malformed packet, and vulnerability use information.

* * * * *